(12) United States Patent  (10) Patent No.: US 7,052,570 B2
Kogi et al.  (45) Date of Patent: May 30, 2006

(54) BEADS ALIGNMENT STRUCTURE, PRODUCTION METHOD THEREOF, AND BEAD ALIGNMENT METHOD FOR CAPILLARY BEADS ARRAY

(75) Inventors: Osamu Kogi, Tokyo (JP); Hiroshi Kishida, Tokyo (JP)

(73) Assignee: Hitachi Software Engineering CO, Ltd., Kanagawa (JP)

( * ) Notice: Subject to any disclaimer, the term of this patent is extended or adjusted under 35 U.S.C. 154(b) by 140 days.

(21) Appl. No.: 10/765,075

(22) Filed: Jan. 28, 2004

(65) Prior Publication Data

US 2004/0209079 A1   Oct. 21, 2004

(30) Foreign Application Priority Data

Apr. 18, 2003 (JP) ............................. 2003-113579

(51) Int. Cl.
  *B29C 37/00* (2006.01)
(52) U.S. Cl. ................... 156/272.2; 264/437; 264/460; 264/496; 264/109
(58) Field of Classification Search ................ 427/487; 264/405, 437, 460, 463, 494, 496, 497
  See application file for complete search history.

(56) References Cited

U.S. PATENT DOCUMENTS

| 3,309,737 A |   | 3/1967 | MacMillan |
| 6,096,159 A | * | 8/2000 | Ito et al. ..................... 156/344 |
| 6,340,588 B1 |   | 1/2002 | Nova et al. |
| 6,863,847 B1 | * | 3/2005 | Fu et al. ..................... 264/1.21 |

2002/0039732 A1   4/2002  Bruchez et al.

FOREIGN PATENT DOCUMENTS

WO   WO 00/61198      4/2000
WO   WO 2004/024328 A1   9/2003

OTHER PUBLICATIONS

Marshall, Andrew, "DNA Chips: An array of possibilities", Nature Biotechnology, vol. 16, Jan. 1998, pp. 27-31.
European Search Report dated Jul. 21, 2004.

* cited by examiner

*Primary Examiner*—Richard Crispino
*Assistant Examiner*—Chris Schatz
(74) *Attorney, Agent, or Firm*—Reed Smith LLP; Stanley P. Fisher, Esq.; Juan Carlos A. Marquez, Esq.

(57) ABSTRACT

A method for producing a capillary bead array comprises the steps of: dispensing beads into a liquid pool, outside a capillary, having a depth of almost the same length as the particle diameter of a bead; leveling the excessive beads by moving a leveling member which is in contact with and relatively capable of be moved to the liquid pool to remove excessive beads that the liquid pool cannot contain; aligning the beads in the liquid pool one- or two-dimensionally; bonding adjacent individual beads to each other; producing a structure having the plurality of beads bonded and aligned one- or two-dimensionally; removing the structure from the liquid pool; and disposing the structure in the capillary formed of soft resin, so that the beads comprising the plurality of beads retaining the one- or two-dimensional alignment can be introduced simultaneously into the capillary. This method reduces the time and cost necessary for bead array production and retains the bead alignment in the capillary, resulting in improved accuracy and reliability in experiments using the capillary array.

10 Claims, 3 Drawing Sheets

BEADS ALIGNMENT STRUCTURE, PRODUCTION METHOD THEREOF, AND BEAD ALIGNMENT METHOD FOR CAPILLARY BEADS ARRAY

BACKGROUND OF THE INVENTION

1. Technical Field

The present invention relates to a method for aligning particulate (granular) beads, and more particularly to a bead alignment method for a capillary bead array having beads aligned in a capillary formed on soft resin.

2. Background Art

JP Patent Publication (Kokai) No. 2000-346842 A is mentioned as prior art concerning a bead alignment method of a capillary bead array. The patent document 1 discloses a technology to introduce beads one by one into a capillary. This prior art is a method for producing a probe array, wherein probe-immobilized fine particles are aligned in a capillary or an optical cell in an order determined in accordance with the type of probe. The method comprises the steps of: retaining the fine particles in a narrow introducing tube; releasing the fine particles one by one under control with a solution into a flowing solution; and introducing them into the capillary to align and retain the fine particles with various probes immobilized thereon in the determined order. The document 1 suggests that the beads introduced into the capillary one by one remain aligned in the capillary.

In addition, JP Patent Publication (Kokai) No. 4-354532 A (1992) discloses the invention wherein different microparticles or different groups of microparticles are irradiated with a plurality of laser beams, and trapped and manipulated with the purpose of controlling the microparticles in a non-contact manner. However, the invention of the document 2 relates to a micro-manipulation technique of combining individual beads with each other, where such technique only involves handling 2 to several microparticles at most with forceps. In this way, the technique disclosed in the patent document 2 requires complicated operations and lacks in practicality. Therefore, there has been a demand for a technique to align an extremely large number of beads one- or two-dimensionally for the use of the beads in a capillary.

According to the existing method of the patent document 1 to introduce beads one by one into a capillary, it takes a progressively longer time to produce a bead array as the number of beads to be introduced increases. The time length to produce a bead array is directly linked to production cost thereof. Further, since the bead alignment retention of the existing techniques relies on capillary shape and size, there is a risk that the bead alignment may become disordered in the capillary. The bead alignment retention has a large impact on the accuracy or reliability of experiments using capillary bead arrays.

SUMMARY OF THE INVENTION

It is therefore an object of the present invention to enhance the accuracy and reliability of experiments using a capillary bead array by retaining bead alignment in a capillary as well as to reduce the time and cost necessary for bead array production.

A first aspect of the present invention is a bead alignment structure wherein a plurality of beads are aligned one- or two-dimensionally and the beads are bonded to each other so as to be integrated while retaining the alignment.

The bead used herein is a spherical object made of plastic or glass and having a particle size of 0.1 µm to 1 mm, and preferably 1 µm to 110 µm. Specifically, beads such as polystyrene beads, polypropylene beads and magnetic beads are used to read fluorescent emissions or the like by the use of a flow cytometer.

The bead alignment structure of the present invention is characterized that beads are bonded to each other and integrated. Thus, a large number of beads, such as from tens of to tens of thousands of beads, can be integrated, and this is extremely preferable for biochemical or immunological tests using beads.

The application of the bead alignment structure according to the present invention is not limited, and it can be used as a bead array for spotting DNAs. In addition, the bead alignment structure may be installed inside various measurement apparatuses.

A second aspect of the present invention is a method for producing the above integrated bead alignment structure. The method comprises the steps of: aligning a plurality of beads one- or two-dimensionally outside a capillary; and bonding the plurality of beads while the bead alignment is retained.

According to the method of the present invention for producing the integrated bead alignment structure, a plurality of beads can be aligned one- or two-dimensionally in a predetermined and desired order. Another bead alignment method comprises the steps of: dispensing a plurality of beads into a liquid pool which has a depth that is almost the same length as the particle diameter of a bead and is disposed outside a capillary; removing excessive beads that the liquid pool cannot contain by leveling the excessive beads by moving a leveling member such as a plate-shape object which is in contact with and relatively capable of being moved to the liquid pool; filling the beads in the liquid pool one- or two-dimensionally; and aligning the beads one- or two-dimensionally.

Further, in a method for producing the integrated bead alignment structure of the present invention comprises, it is preferable:

to add dropwise or spray a solution containing a photo-polymerization compound and a photo-polymerization initiator to a liquid pool having the plurality of beads aligned one- or two-dimensionally and to irradiate contact points of individual adjacent beads with exciting light so as to photo-polymerize the photo-polymerization compound; or to add dropwise or spray a solution containing a polymerization compound and a polymerization initiator to the liquid pool having the plurality of beads aligned one- or two-dimensionally and to heat the liquid pool so as to polymerize the polymerization compound. Adjacent beads are thereby bonded and a bead alignment structure having a plurality of beads aligned one- or two-dimensionally is produced. Alternatively, when the plurality of beads are made of plastic, an integrated bead alignment structure having a plurality of beads aligned one- or two-dimensionally can be produced by radiating laser light to the vicinity of contact points of individual adjacent beads in the liquid pool having the plurality of beads aligned one- or two-dimensionally to temporarily melt the vicinity of the contact points, thereby bonding adjacent beads to each other.

Although the integrated bead alignment structure of the present invention has a plurality of beads aligned one- or two-dimensionally, it can be easily made to be a structure in which the beads are aligned three-dimensionally by stacking one bead alignment structure upon another.

A third aspect of the present invention is a method for aligning the above integrated bead alignment structure in a capillary bead array having particulate beads aligned in a capillary formed of soft resin. The method comprises aligning a plurality of beads one- or two-dimensionally outside the capillary, producing a bead alignment structure having the plurality of beads bonded and integrated while the bead alignment is retained, disposing the bead alignment structure in the capillary, and introducing the beads comprising the plurality of beads retaining one- or two-dimensional alignment into the capillary at the same time.

According to the bead alignment method for a capillary bead array of the present invention, it is possible to align a plurality of beads one- or two-dimensionally in a predetermined and desired order. Another alignment method comprises the steps of: dispensing a plurality of beads in a liquid pool which has a depth that is almost the same length as the particle diameter of a bead and is placed outside a capillary; removing excessive beads that the liquid pool cannot contain by leveling the excessive beads by moving a leveling member such as a plate-shape object which is in contact with and relatively capable of being moved to the liquid pool; filling the beads in the liquid pool one- or two-dimensionally; and aligning the beads one- or two-dimensionally.

Additionally, in a method of the present invention for aligning beads of a capillary bead array, it is preferable:

to add dropwise or spray a solution containing a photo-polymerization compound and a photo-polymerization initiator to a liquid pool having a plurality of beads aligned one- or two-dimensionally and to irradiate contact points of individual adjacent beads with exciting light so as to photo-polymerize the photo-polymerization compound; or to add dropwise or spray a solution containing a polymerization compound and a polymerization initiator to a liquid pool having a plurality of beads aligned one- or two-dimensionally and to heat the liquid pool so as to polymerize the polymerization compound, thereby bonding adjacent beads to each other, so that a bead alignment structure comprising a plurality of beads retaining a one- or two-dimensional alignment is produced. Alternatively, when the plurality of beads are made of plastic, a bead alignment structure having a plurality of beads retaining a one- or two-dimensional alignment can be produced by radiating laser light to the vicinity of contact points of individual beads in the liquid pool having the plurality of beads aligned one- or two-dimensionally to temporarily melt the vicinity of the contact points, thereby bonding adjacent beads to each other.

Furthermore, in a bead alignment method of a capillary bead array of the present invention, it is preferable to introduce a plurality of beads retaining a one- or two-dimensional alignment into the capillary at the same time by taking out the bead alignment structure having a plurality of beads retaining a one- or two-dimensional alignment from the liquid pool and disposing it in the capillary.

The above aspects of the present invention will be explained more specifically. Initially, the plurality of beads are dispensed into a liquid pool outside the capillary having a depth that is almost the same length as the particle diameter of a bead, and excessive beads that the liquid pool cannot contain are removed by leveling the excessive beads by moving a leveling member which is in contact with and relatively capable of being moved to the liquid pool, thereby aligning the beads one- or two-dimensionally in the liquid pool. A solution containing a photo-polymerization compound and a photo-polymerization initiator are added dropwise or sprayed to the liquid pool having the plurality of beads aligned one- or two-dimensionally and exciting light is radiated to contact points of adjacent beads, polymerizing the photo-polymerization compound and allowing adjacent beads to be bonded. Alternatively, a solution containing a polymerization compound and a polymerization initiator is added dropwise or sprayed to the liquid pool having the plurality of beads aligned one- or two-dimensionally and the liquid pool is heated, polymerizing the polymerization compound and allowing adjacent beads to be bonded. In this way, a structure having a plurality of beads bonded to each other and aligned one- or two-dimensionally is produced. The structure is removed from the liquid pool and disposed in a capillary formed of soft resin. All of the beads comprising the plurality of beads retaining a one- or two-dimensional alignment can thereby be introduced into the capillary at the same time. Furthermore, the bonding of the plurality of beads aligned one- or two-dimensionally can eliminate the risk of a disordered bead alignment and provide a method for retaining the bead alignment without depending on the shape or the size of a capillary.

DETAILED DESCRIPTION OF THE PREFERRED EMBODIMENTS

Figure 1:
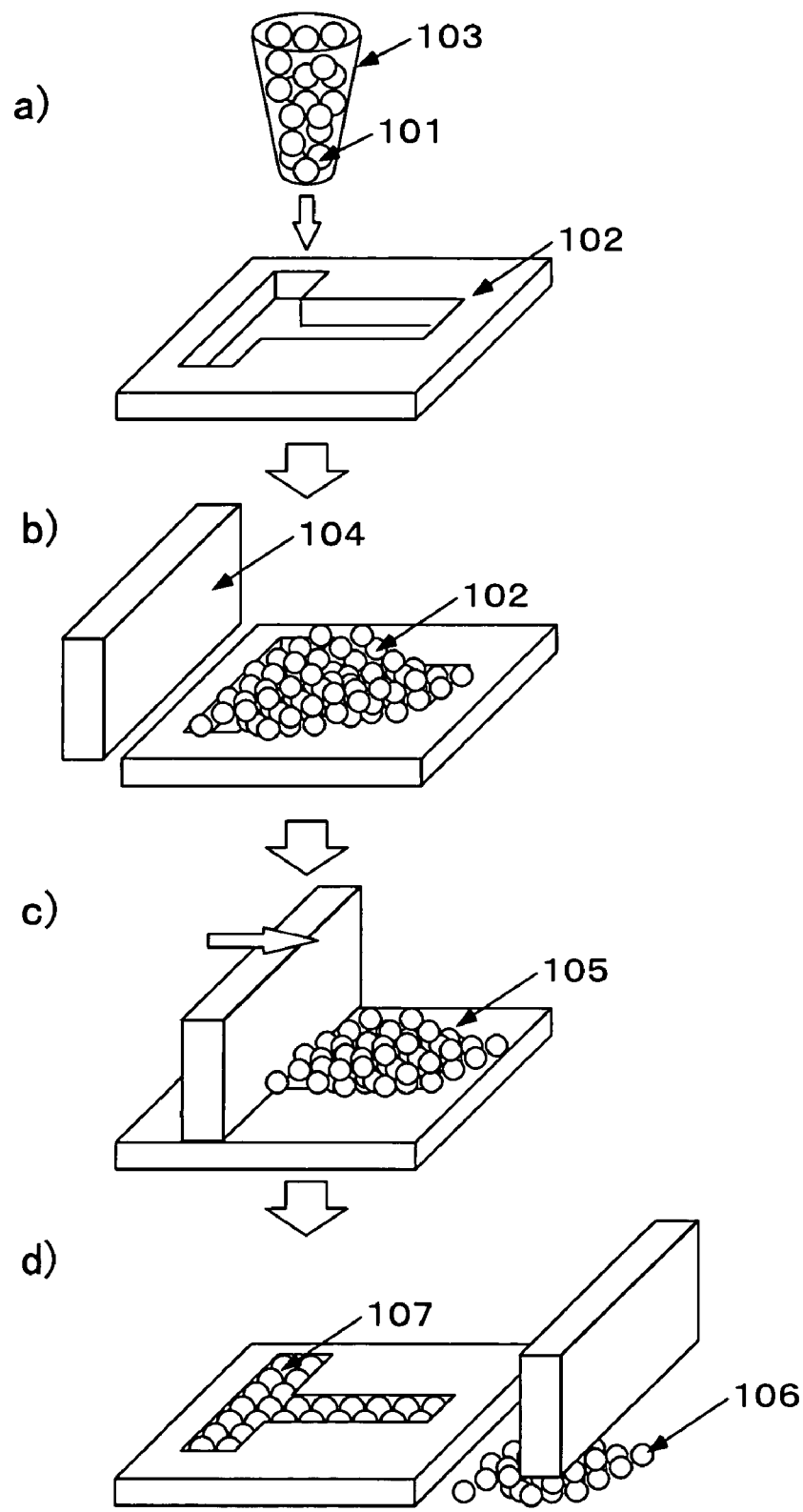
FIG. 1 shows an embodiment for aligning particulate beads one- or two-dimensionally according to the present invention.

FIG. 1 is a schematic view showing an embodiment of the present invention for aligning particulate beads one- or two-dimensionally. A plurality of beads 101 are dispensed into a liquid pool 102 having a depth of substantially the same magnitude as the particle size of a bead 101 using a dispenser 103 (FIG. 1(a)). A leveling member 104 that is in contact with and relatively capable of being moved to the liquid pool 102 is moved for leveling beads 105, and excessive beads 106 that the liquid pool 102 cannot contain are removed, so that beads 107 are aligned one- or two-dimensionally in the liquid pool (FIG. 1(b) to (d)).

For convenience of explanation, FIG. 1 shows an integrated bead alignment structure having a T-shape, but the bead alignment structure of the present invention is not limited thereto. Any shape having the plurality of beads aligned one- or two-dimensionally can be used, for example, a one-dimensional linear shape or a two-dimensional n×m rectangle.

Figure 2:
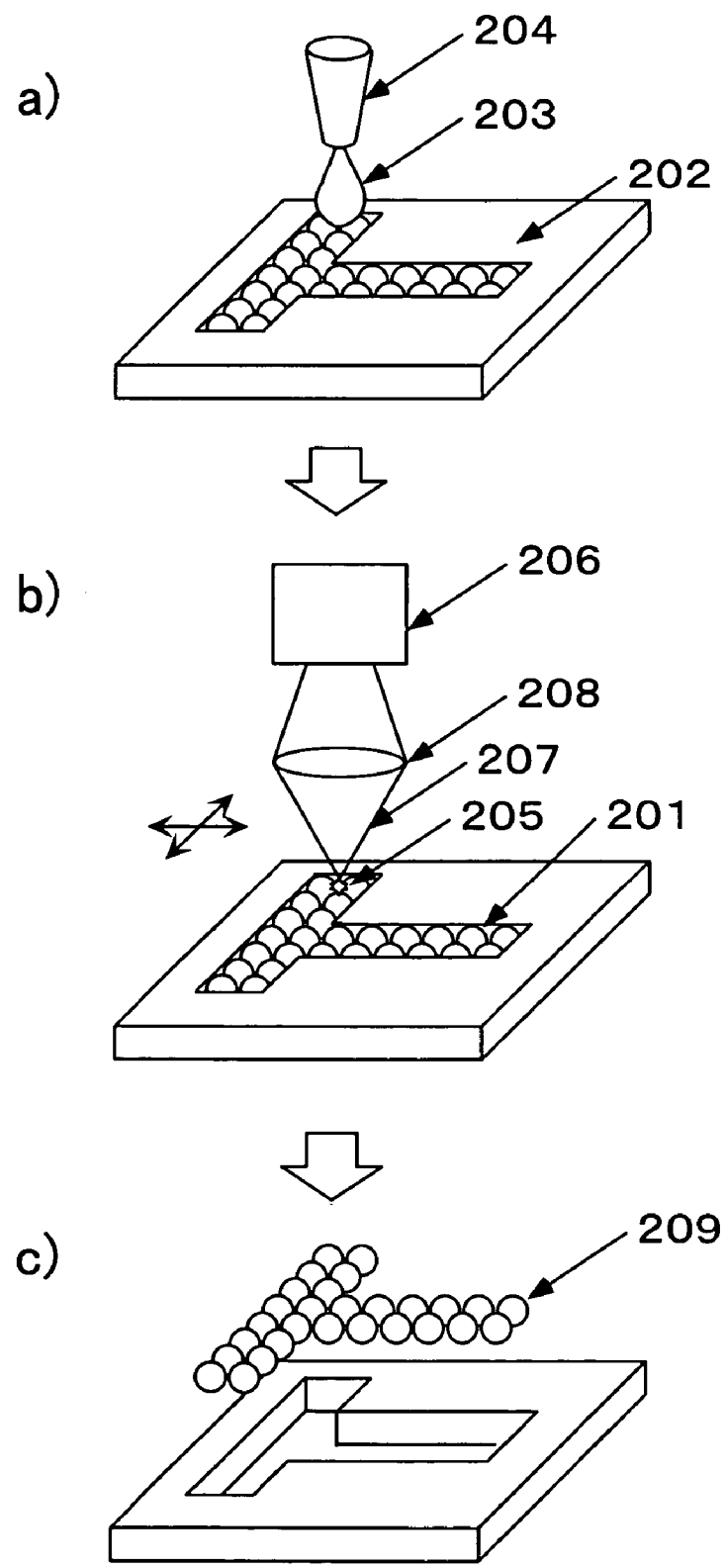
FIG. 2 shows an embodiment for producing a bead structure of the present invention by bonding the plurality of beads aligned one- or two-dimensionally.

FIG. 2 is a schematic view showing a method of the present invention for producing a structure comprising a plurality of beads bonded to each other and aligned one- or two-dimensionally. A solution 203 containing a photo-polymerization compound and a photo-polymerization initiator is added dropwise by a dispenser 204 to the liquid pool 202 having the plurality of beads 201 aligned one- or two-dimensionally (FIG. 2(a)). An exciting light 207 from an excitation light source 206 is radiated to a contact point 205 of adjacent beads through a lens 208 to allow the photo-polymerization compound present on the bead contact point 205 irradiated with the exciting light 207 to be photo-polymerized, thereby bonding adjacent beads 201 to each other (FIG. 2(b)). The integrated bead structure 209 is removed from the liquid pool 202 (FIG. 2(c)). The liquid pool 202 or lens 208 is manipulated one- or two-dimensionally to radiate the exciting light 207 to the contact points 205 of all the beads 201 to be bonded. The structure 209 having a plurality of beads bonded to each other while a one- or two-dimensional alignment is retained can be thereby produced.

Figure 3:
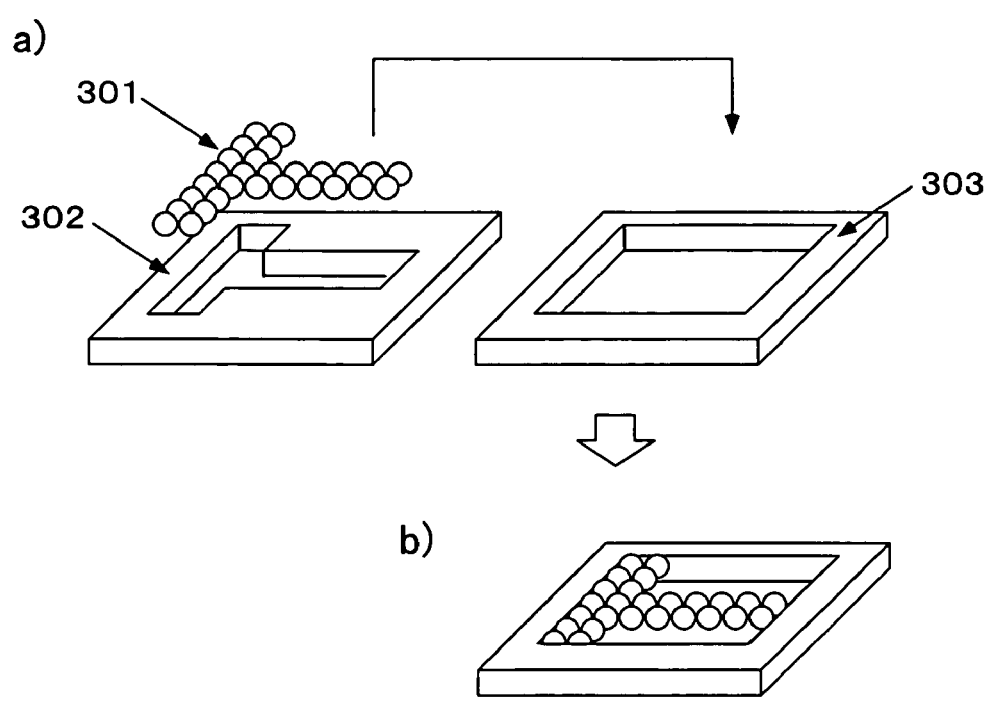
FIG. 3 shows an embodiment for disposing in a capillary the structure of the present invention comprising the plurality of beads bonded to each other while the in one- or two-dimensional alignment is retained.

FIG. 3 is a schematic view showing a system wherein the structure of the present invention comprising a plurality of beads bonded to each other while a one- or two-dimensional alignment is retained is placed in a capillary formed of soft resin. The structure 301 having a plurality of beads bonded and aligned one- or two-dimensionally is removed from the liquid pool 302 and placed in the capillary 303 formed of soft resin. The beads comprising the plurality of beads retaining one- or two-dimensional alignment can be thereby simultaneously introduced into the capillary 303.

EFFECT OF THE INVENTION

According to the present invention, a structure wherein a plurality of beads are bonded to each other while retaining a one- or two-dimensional alignment can be easily and unfailingly produced. In addition, the arrangement of the structure in a capillary formed of soft resin or the like enables the beads comprising the plurality of beads retaining the one- or two-dimensional alignment to be easily and unfailingly introduced simultaneously to the capillary. Further, the bonding of the plurality of beads aligned one- or two-dimensionally can eliminate the risk of the bead alignment becoming disordered and allow the bead alignment to be retained without depending on the shape or the size of the capillary, thereby reducing the cost of biochemical or immunological examinations using beads and enabling a large improvement of their accuracy.

What is claimed is:

1. A method for producing an integrated bead alignment structure comprising the steps of:
   aligning a plurality of beads one- or two-dimensionally outside a capillary;
   bonding the plurality of beads to each other while the bead alignment is retained
   dispensing the plurality of beads into a liquid pool outside the capillary having a depth that is almost the same length as the particle diameter of a bead;
   removing excessive beads that the liquid pool cannot contain by leveling the excessive beads by moving a leveling member which is in contact with and relatively capable of being moved to the liquid pool; and
   filling and aligning the beads in the liquid pool one- or two-dimensionally.

2. The method for producing a bead alignment structure according to claim 1, wherein the plurality of beads are aligned one- or two-dimensionally in a predetermined and desired order.

3. The method for producing a bead alignment structure according to claim 1, further comprising the steps of:
   adding dropwise or spraying a solution containing a photo-polymerization compound and a photo-polymerization initiator to the liquid pool having the plurality of beads aligned one- or two-dimensionally; and radiating an exciting light to the vicinity of contact points of adjacent individual beads to polymerize the photo-polymerization compound; or
   adding dropwise or spraying a solution containing a polymerization compound and a polymerization initiator to the liquid pool having the plurality of beads aligned one- or two-dimensionally; and heating the liquid pool to polymerize the polymerization compound; and
   thereby bonding adjacent beads so that an integrated bead alignment structure comprising a plurality of beads retaining the one- or two-dimensional alignment is produced.

4. The method for producing a bead alignment structure according to claim 2, wherein when the plurality of beads are made of plastic, the vicinity of contact points of individual beads is temporarily melted by radiating laser light thereto in the liquid pool having the plurality of beads aligned one- or two-dimensionally to bond the beads to adjacent ones, so that an integrated bead alignment structure comprising a plurality of beads retaining a one- or two-dimensional alignment is produced.

5. A bead alignment method for a capillary array having particulate beads aligned in a capillary, comprising the steps of:
   aligning the plurality of beads one- or two-dimensionally outside the capillary;
   producing a bead alignment structure having the plurality of beads bonded to and integrated with each other while retaining the bead alignment; and
   disposing the bead alignment structure comprising the plurality of beads retaining one- or two-dimensional alignment into the capillary.

6. The bead alignment method for a capillary array according to claim 5, wherein the plurality of beads are aligned one-or two-dimensionally in a predetermined order.

7. The bead alignment method for a capillary bead array according to claim 5, further comprising the steps of: dispensing the plurality of beads to a liquid pool, outside the capillary, having a depth that is almost the same length as the particle diameter of a bead; removing excessive beads that the liquid pool cannot contain by leveling the excessive beads by moving a leveling member which is in contact with and relatively capable of being moved to the liquid pool; filling the beads in the liquid pool one- or two-dimensionally; and aligning the beads one- or two-dimensionally.

8. The bead alignment method for a capillary bead array according to claim 7, further comprising the steps of:
   adding dropwise or spraying a solution containing a photo-polymerization compound and a photo-polymerization initiator to the liquid pool having the plurality of beads aligned one- or two-dimensionally, and radiating an exciting light to the vicinity of contact points of adjacent individual beads to polymerize the photo-polymerization compound; or
   adding dropwise or spraying a solution containing a polymerization compound and a polymerization initiator to the liquid pool having the plurality of beads aligned one- or two-dimensionally, and heating the liquid pool to polymerize the polymerization compound;
   thereby bonding adjacent beads to each other, so that a bead alignment structure comprising a plurality of beads retaining a one- or two-dimensional alignment is produced.

9. The bead alignment method for a capillary bead array according to claim 5, wherein, when the beads are made of plastic, the vicinity of contact points of individual beads is temporarily melted by radiating a laser light thereto in a liquid pool having the plurality of beads aligned one- or two-dimensionally, and thereby adjacent beads are bonded to each other, so that a bead alignment structure comprising a plurality of beads retaining a one- or two-dimensional alignment is produced.

10. The bead alignment method for a capillary beads array according to claim 7, wherein the integrated bead alignment structure comprising a plurality of beads retaining a one- or two-dimensional alignment is removed from the liquid pool and disposed in the capillary, so that the beads comprising the plurality of beads retaining a one- or two-dimensional alignment are introduced into the capillary.

* * * * *